(12) United States Patent
Muniz et al.

(10) Patent No.: US 9,465,630 B1
(45) Date of Patent: Oct. 11, 2016

(54) ASSIGNING DYNAMIC WEIGHTED VARIABLES TO CLUSTER RESOURCES FOR VIRTUAL MACHINE PROVISIONING

(71) Applicant: CA, Inc., Islandia, NY (US)

(72) Inventors: Henry Muniz, Smithtown, NY (US); Julio Quintana, Jr., Baiting Hollow, NY (US); Orlando J. Pereira, Lake Ronkonkoma, NY (US); Frank V. Branciforti, Seaford, NY (US); James Willing, Bentleigh East (AU); John Morales, Nesconset, NY (US)

(73) Assignee: CA, Inc., New York, NY (US)

(*) Notice: Subject to any disclaimer, the term of this patent is extended or adjusted under 35 U.S.C. 154(b) by 283 days.

(21) Appl. No.: 13/771,999

(22) Filed: Feb. 20, 2013

(51) Int. Cl.
*G06F 9/455* (2006.01)

(52) U.S. Cl.
CPC .................................... *G06F 9/455* (2013.01)

(58) Field of Classification Search
None
See application file for complete search history.

(56) References Cited

U.S. PATENT DOCUMENTS

| | | | |
|---|---|---|---|
| 8,230,069 B2* | 7/2012 | Korupolu | 709/226 |
| 8,468,535 B1* | 6/2013 | Keagy et al. | 718/104 |
| 2005/0160429 A1* | 7/2005 | Hameleers et al. | 718/105 |
| 2007/0271560 A1* | 11/2007 | Wahlert | G06F 8/61 718/1 |
| 2011/0225277 A1 | 9/2011 | Freimuth et al. | |
| 2011/0295999 A1* | 12/2011 | Ferris | G06F 9/5072 709/224 |
| 2012/0324071 A1* | 12/2012 | Gulati et al. | 709/223 |
| 2013/0173804 A1* | 7/2013 | Murthy et al. | 709/226 |
| 2014/0059207 A1* | 2/2014 | Gulati et al. | 709/224 |

* cited by examiner

*Primary Examiner* — Abdullah Al Kawsar
*Assistant Examiner* — Michael Ayers
(74) *Attorney, Agent, or Firm* — Myers Bigel & Sibley, P.A.

(57) ABSTRACT

Systems, methods and computer program products for provisioning a virtual machine are disclosed. A request to provision a virtual machine is received. Resources are identified and utilization of the resources determined for each cluster of the plurality of virtual machine clusters, the resources comprising internet protocol (IP) addresses, memory and CPUs. The availability of clusters is analyzed based on the determined resource utilization for each cluster. The analysis includes assigning dynamic weights to resources of each cluster and calculating an availability of each cluster. A cluster availability report is output indicating an availability status for each virtual machine cluster. A system for provisioning a virtual machine includes a provision manager, a resource determiner, an availability analyzer and an availability reporter.

18 Claims, 10 Drawing Sheets

800

VLAN SUMMARIES

| VLAN ID | Current VM's | Maximum VM's | Available VM Capacity | Average CPU Use (%) | Mem Used (%) | IP Addresses Free | Disk Free (TB) |
|---|---|---|---|---|---|---|---|
| VLAN 1 | 255 | 500 | 245 | 10 | 40 | 130 | 2.301 |
| VLAN 2 | 244 | 500 | 256 | 20 | 29 | 25 | 4.325 |
| VLAN 3 | 534 | 450 | -84 | 60 | 52 | 233 | 4.798 |
| VLAN 4 | 391 | 500 | 109 | 22 | 62 | 88 | 4.706 |
| VLAN 5 | 386 | 500 | 114 | 7 | 65 | 170 | 4.063 |
| VLAN 6 | 371 | 500 | 129 | 25 | 58 | 200 | 2.231 |
| VLAN 7 | 404 | 500 | 96 | 29 | 64 | 112 | 3.822 |
| VLAN 8 | 323 | 350 | 27 | 65 | 85 | 210 | 3.143 |
| VLAN 9 | 340 | 350 | 10 | 76 | 85 | 250 | 0.512 |

Column labels: 814G, 824B, 824C, 824A

|  |  |  | VLAN SUMMARIES | 824B | 824C | 824A |  |
|---|---|---|---|---|---|---|---|
| VLAN ID | Current VM's | Maximum VM's | Available VM Capacity | Average CPU Use (%) | Mem Used (%) | IP Addresses Free | Disk Free (TB) |
| VLAN 1 | 255 | 500 | 245 | 10 | 40 | 130 | 2.301 |
| VLAN 2 | 344 | 500 | 156 | 86 | 49 | 80 | 3.425 |
| VLAN 3 | 534 | 450 | -84 | 60 | 52 | 233 | 4.798 |
| VLAN 4 | 391 | 500 | 109 | 22 | 62 | 88 | 4.706 |
| VLAN 5 | 386 | 500 | 114 | 7 | 65 | 170 | 4.063 |
| VLAN 6 | 371 | 500 | 129 | 25 | 58 | 200 | 2.231 |
| VLAN 7 | 404 | 500 | 96 | 29 | 64 | 112 | 3.822 |
| VLAN 8 | 323 | 350 | 27 | 65 | 85 | 210 | 3.143 |
| VLAN 9 | 340 | 350 | 10 | 76 | 85 | 250 | 0.512 |

FIGURE 9

ASSIGNING DYNAMIC WEIGHTED VARIABLES TO CLUSTER RESOURCES FOR VIRTUAL MACHINE PROVISIONING

BACKGROUND

The present disclosure relates generally to information technology and more particularly, to computer systems in virtual environments.

Virtualized computing environments, also referred to as cloud computing systems, are used to provide computing resources to end users. In a cloud computing environment, the physical hardware configuration is hidden from the end user. Cloud computing systems may include servers, network storage devices, routers, gateways, communication links and other devices.

In a typical cloud computing environment, applications may be executed on virtual machines (VMs), which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Users may request one or more virtual machines of the cloud for use. Current techniques may determine where to provision a virtual machine based on virtual machine memory configuration and server capacity. However, such techniques for accurately balancing the load are inadequate, and administrators often manually disable, analyze and enable multiple servers to ensure load balancing.

BRIEF SUMMARY

Systems, methods and computer program products for provisioning a virtual computer on a computer system are disclosed. According to an aspect of the disclosure, a request to provision a virtual machine from a plurality of virtual machine clusters is received. Utilization of resources for each cluster of the plurality of virtual machine clusters is determined. Weights are assigned to the resources for each cluster of the plurality of virtual machine clusters responsive to the utilization of the respective resources. The utilization and weights of the resources for each cluster of the plurality of virtual machine clusters are analyzed to identify clusters that are available for provisioning a virtual machine. A virtual machine may be provisioned from a cluster of the plurality of virtual machine clusters identified as available for provisioning a virtual machine. In some embodiments, each cluster of the plurality of virtual machine clusters is a virtual local area network (vLAN).

In many aspects, the plurality of resources comprises internet protocol (IP) addresses, memory, CPUs, or other cluster resources. The utilization of IP addresses indicates a number of IP addresses used out of a total number of possible IP addresses for a respective cluster of the plurality of virtual machine clusters. The utilization of memory indicates memory used out of a total memory capacity for the respective cluster. The utilization of CPUs indicates CPU workload out of a total CPU capacity for the respective cluster.

In another aspect, a cluster availability report is outputted indicating an availability status for each cluster of the plurality of virtual machine clusters. In some cases, the cluster availability report comprises a heat map of cluster information indicating an availability of each cluster according to a display code.

In another aspect, for each cluster of the plurality of virtual machine clusters, a first weight is assigned to a first resource of the respective cluster of the plurality of virtual machine clusters based on a first comparison of utilization of the first resource to a first utilization threshold. A second weight is assigned to a second resource of the respective cluster of the plurality of virtual machine clusters based on a second comparison of utilization of the second resource to a second utilization threshold. The second weight is determined responsive to a comparison of the first comparison and the second comparison.

In a further aspect, an availability value for the respective cluster of the plurality of virtual machine clusters is calculated based on the weights assigned to the resources of the respective cluster. The respective cluster of the plurality of virtual machine clusters is determined to be available for provisioning a virtual machine based on an availability value calculated for the respective cluster.

In another aspect, the first weight of the respective cluster of the plurality of virtual machine clusters is assigned to the second resource of the respective cluster and the second weight of the respective cluster is assigned to the first resource of the respective cluster when an amount that the second resource does not meet the second utilization threshold for the second resource is greater than the amount the first resource does not meet the first utilization threshold for the first resource.

In an aspect, the determining, the assigning, the analyzing and the identifying are repeated based on a repetitive schedule or a termination of a lease of a virtual machine of a cluster of the plurality of virtual machine clusters.

In another aspect, a computer system for provisioning a virtual machine on a computer system comprises a provision manager configured to receive a request to provision a virtual machine from a plurality of virtual machine clusters. The system also comprises a resource determiner configured to determine utilization of resources for each cluster of the plurality of virtual machine clusters. The system further comprises an availability analyzer configured to analyze availability of clusters based on the identified resource utilization for each cluster. For each cluster, weights are assigned to the resources for each cluster of the plurality of virtual machine clusters responsive to the utilization of the respective resources. Resources and weights of the resources are analyzed for each cluster of the plurality of virtual machine clusters to identify clusters that are available for provisioning a virtual machine.

In a further aspect, the provision manager is further configured to provision a virtual machine from a cluster of the plurality of virtual machine clusters identified as available for provisioning a virtual machine.

In another aspect, the system also comprises an availability reporter configured to output a cluster availability report wherein the cluster availability report indicates an availability status for each cluster of the plurality of virtual machine clusters.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 8-9 are example views of availability report heat maps according to some embodiments.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
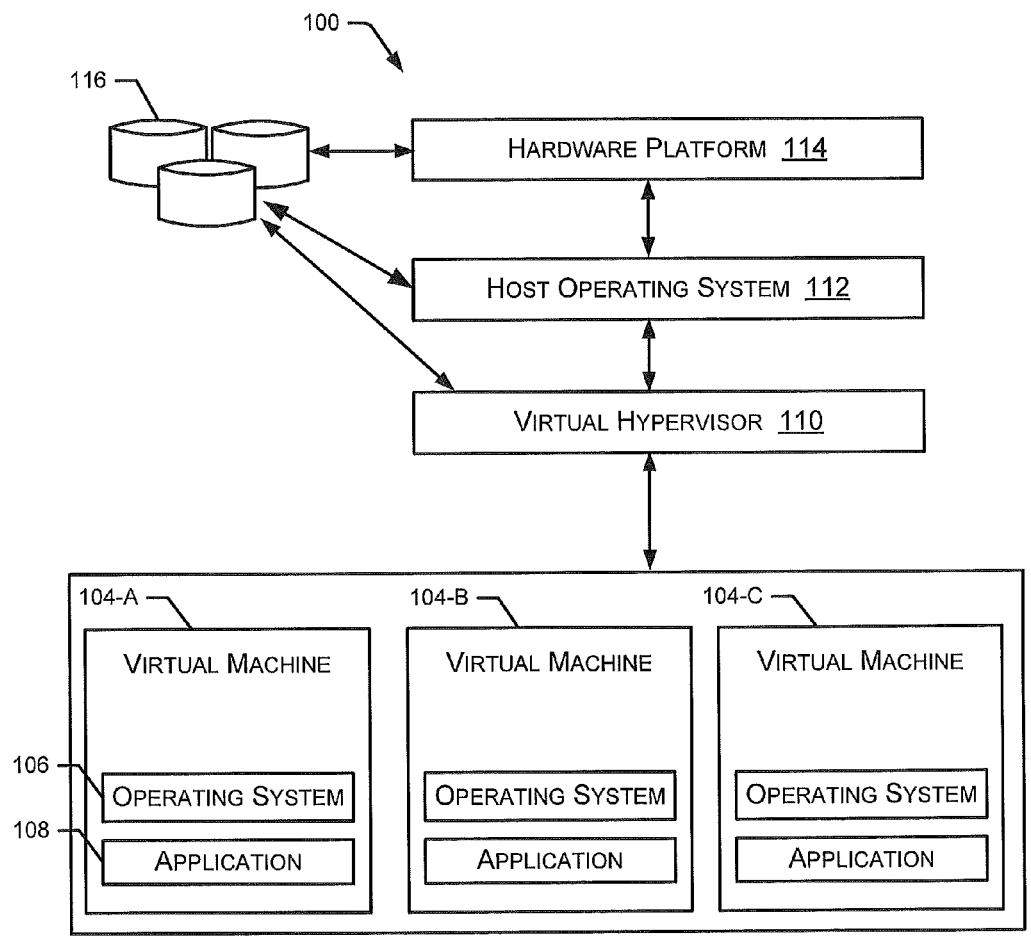
FIG. 1 is a block diagram of a computing system that supports a virtual operating environment.

FIG. 1 illustrates server system 100 for a virtualized computing environment in which embodiments of the subject matter of the present disclosure can function. The server system 100 generally hosts one or more virtual machines 104A-104C (hereafter virtual machines 104), each of which runs a guest operating system 106 and application 108. The computing needs of users drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), handheld computer, mobile computing platform, server, or any other appropriate computer hardware. The hardware platform 114 may include computing resources such as a central processing unit (CPU); networking controllers; communication controllers; a display unit; a program and data storage device; memory controllers; input devices (such as a keyboard, a mouse, etc.) and output devices such as printers. The CPU may be any conventional processor, such as the AMD Athlon™ 64, or Intel® Core™ Duo processor sets.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users and is responsible for the management and coordination of activities and the sharing of the computing resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machine 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating system 106. In fact, the virtual hypervisor 110 merely maps the guest operating system's priority level to a priority level lower than the top most priority level. As a result, the virtual hypervisor 110 can intercept the guest operating system 106, executing instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Figure 2:
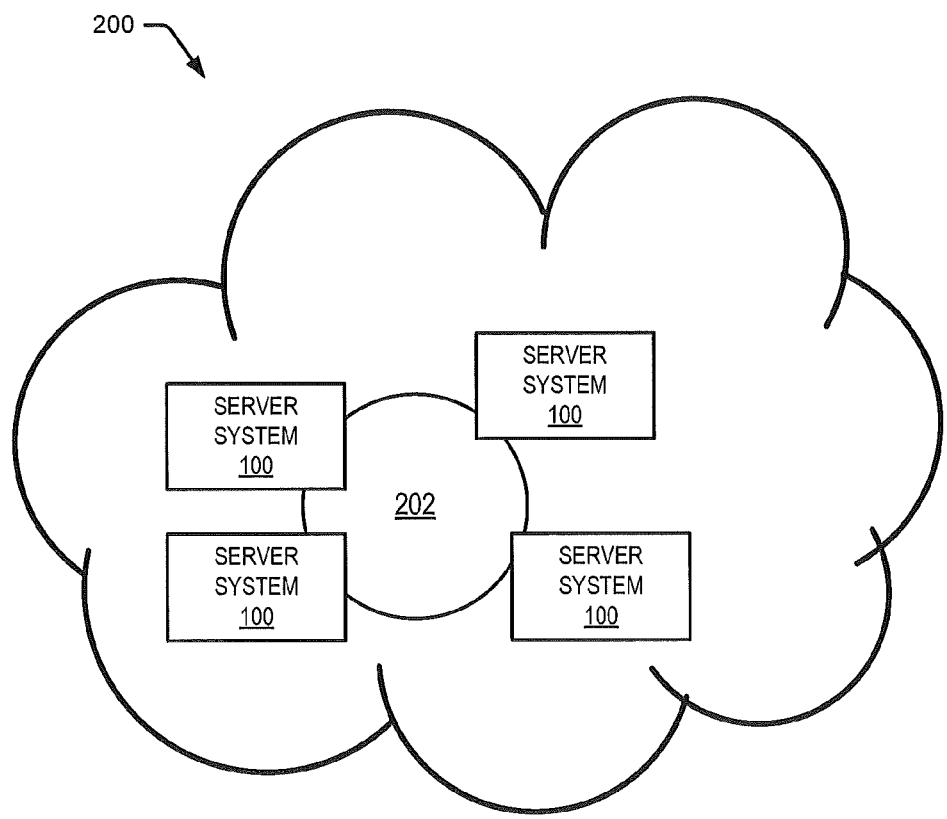
FIG. 2 illustrates a cloud computing environment.

Referring to FIG. 2, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, workstations, UNIX-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 202. The network 202 facilitates wireless or wireline communication, and may communicate using, for example, IP packets, Frame Relay frames, Asynchronous Transfer Mode (ATM) cells, voice, video, data, and other suitable information between network addresses. The network 202 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems", it will be appreciated that any suitable computing device may be used.

Users may request one or more virtual machines for use from servers 100 in a cloud 200 or cluster of servers. Current techniques for determining where to provision a virtual machine are inaccurate and tedious. There are other factors that are needed in order to determine proper placement of a virtual machine to ensure proper balancing across all hosts or server clusters. For example, server memory or CPU capacity may appear acceptable for a cluster of servers, but the IP addresses may be very limited. Therefore, this cluster may be selected to provision a virtual machine when the lack of IP addresses indicates that this provisioning would be a mistake. Because previous techniques for balancing the load are inadequate, an administrator has to review custom reports several times a day and manually disable and enable servers to ensure the load is balanced across all the servers in a cloud environment.

Systems, methods and computer program products for provisioning a virtual machine from a plurality of virtual machine clusters are disclosed. The embodiments described below offer a different technique that may be used to determine proper placement of a new virtual machine (VM) in a large cloud environment organized into clusters of servers with virtual machines. Dynamic weighted variables can be used to effectively determine which server cluster or vLAN can handle provisioning requests. Weights may be different numerical values, whole or partial, such as 1, 2, 3, depending on the metric and formula for weighting resources of clusters or vLANs. Weights may also be letters such as A, B, C or any other string that has an inherent or assigned value relative to other strings. Dynamic weights may be assigned to resources of each vLAN cluster, such as memory, CPUs (physical and/or virtual), disk storage and IP-addresses. The availability of vLANs may be calculated based on these weighted resources. This is very important in order to ensure successful provisioning in private clouds that are using high end hosts servers.

For example, a server farm, such as a Lab on Demand® (LoD) VMware® ESX® host server farm, consists of many blade servers. Each blade may consist of 24 cores and 512 GB RAM. A vLAN may have four of these servers in a cluster for a total of 96 cores and 2 TB of memory. Due to the large amount of memory available in a vLAN, it is possible for a provisioning manager to deploy to a vLAN that does not have any available IP-addresses, therefore causing the provisioning to fail. The dynamic weighted variable technique identifies vLANs that are starved for memory, CPU utilization, storage or IP-addresses to ensure that there are enough resources available to provision the VM and run at proper performance.

For example, according to various embodiments, a resource determined to be most critical for a vLAN, such as IP addresses, may be assigned a weight ranking of 1, while other resources such as memory or CPUs may receive a ranking of 2 and 3, respectively. Other resources can receive other ranking weights.

If a resource criticality changes, the weights can be dynamically reassigned. For example, if memory capacity becomes more critical, such as it exceeding a threshold utilization of 85%, while IP addresses have been released for use, memory capacity could receive a ranking of 1 and IP addresses may receive a ranking of 2 or 3. Other factors, such as expiring leases of virtual machines, can cause the weighted variables to dynamically readjust. These weights may be factors in calculating an availability value to be reported. Availability values are used to determine whether or not a cluster is available for provisioning.

According to further embodiments, resource utilization (CPU, memory, and disk) may be extracted, including the number of VMs hosted and the vLAN that it is assigned for each of the many hosts among multiple vLANs in a geographical area. Resources may be identified and availability analyzed. An availability report may be output. This may lead to an automatic provisioning selection or to a user friendly report, such as a visual heat map summary page. A simple heat map made available to cluster administrators can help them to easily determine which vLAN to enable or disable to ensure successful provisioning and proper performance.

A main advantage of the technique used in the many embodiments is that it provides an automated method to provide the necessary information to properly manage and provision the vLANs used by an organization. Current products cannot ensure that the vLAN assigned to be used for provisioning a VM has sufficient resources to host the VM.

Figure 3:
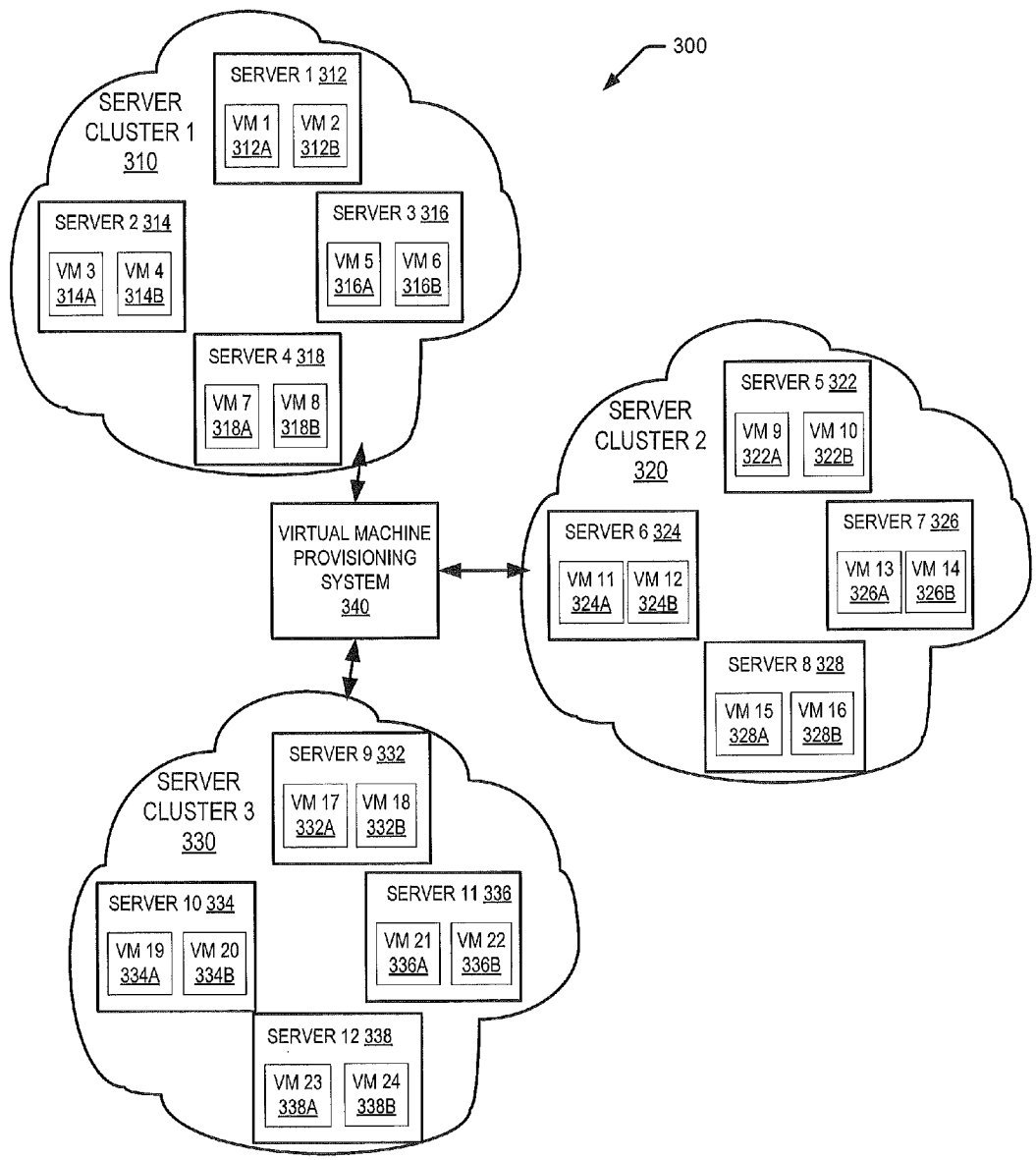
FIG. 3 illustrates clustering of virtual machines in a virtual operating environment according to some embodiments.
Figure 4:
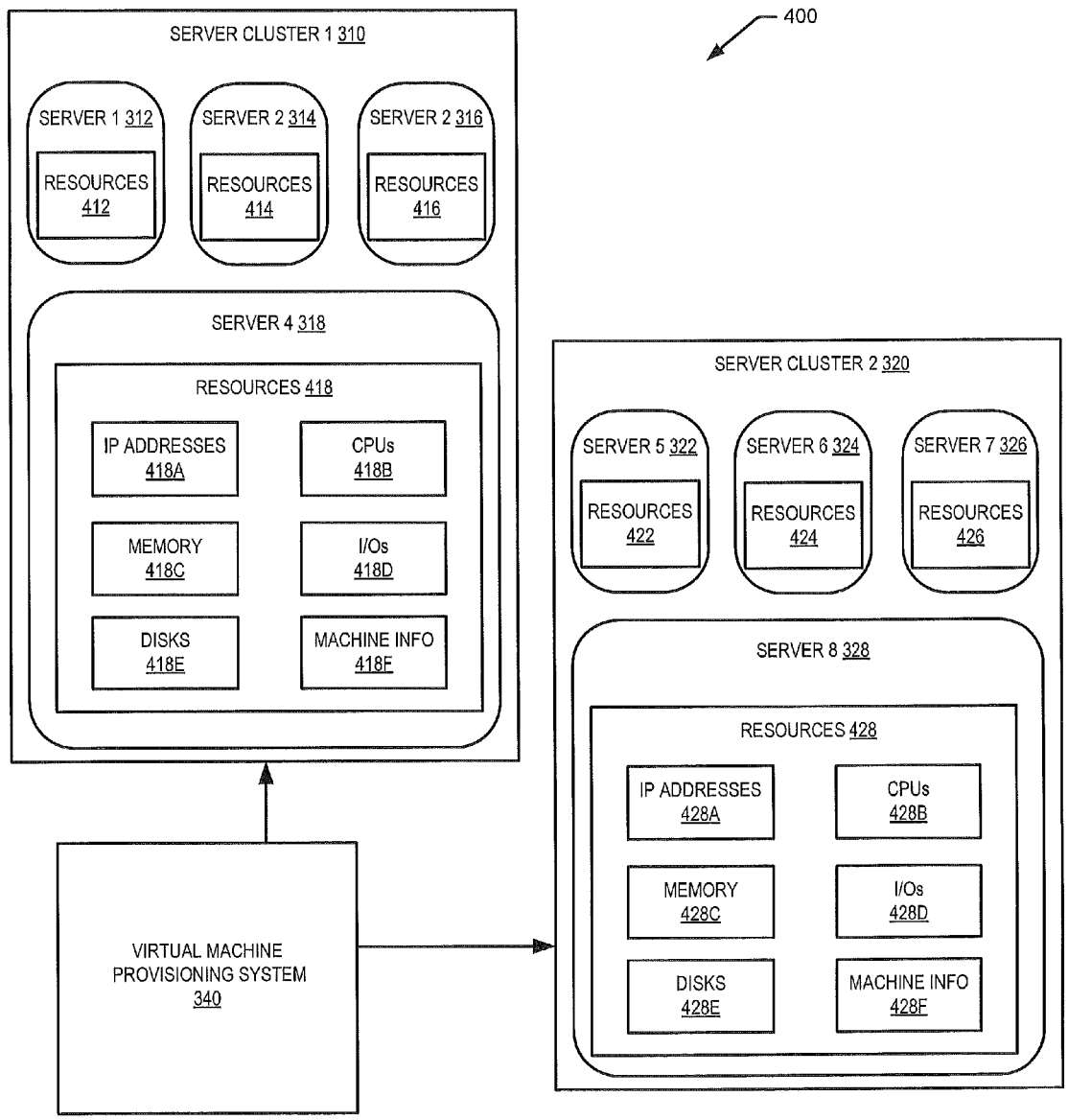
FIG. 4 illustrates aspects of virtual machines in a virtual operating environment according to some embodiments.

Example embodiments are further described using FIGS. 3-9. FIG. 3 illustrates an example system 300 with server 1 312 through server 12 338 grouped into three server clusters, server cluster 1 310, server cluster 2 320 and server cluster 3 330, according to an embodiment. Virtual machines VM1 312A to VM24 338B can be hosted by servers from server 1 312 through server 12 338 in server clusters 310, 320 and 330 and grouped into vLANs for management and/or operational purposes. For example, virtual machines on servers can be grouped into clusters based on load balancing needs, security needs, redundancy needs, or any other needs as determined by a system administrator. Although three clusters are illustrated in FIG. 3, any desired number of clusters can be defined subject to system limitations, and each of the clusters can include any desired number of virtual machines subject to server limitations.

Virtual machines can be deployed in particular virtualization environments and organized to increase the efficiency of operating and managing a virtual computing environment. For example, virtual machines may be grouped into clusters in order to provide load balancing across multiple servers. Each cluster may be considered a virtual local area network (vLAN).

Virtual machines that are deployed within a single cluster may also share physical resources within a server 100. As shown by example system 400 in FIG. 4, virtual machines that are deployed within a single cluster may share resources 412-418 from servers 1-12 312-318. Such resources may include, but are not limited to, network addresses such as IP addresses 418A, memory 418C and disks 418E and inputs/outputs 418D. Resources may also include CPUs 418B (physical or virtual). One or more physical CPUs may time share their cycles, allowing for multiple virtual CPUs. Other various resources of servers 312 may be identified, including machine information 318F, which may include details about the machine hardware or software configuration of a respective server. Other resources may include additional details about storage, communication facilities and other services of a server.

Resources may be attributed on a per server basis, virtual machine basis, cluster basis, or vLAN basis. For example, resources 412-418 of server cluster 310 may be compared to resources 422-428 of server cluster 320. Furthermore, individual resources may be identified and compared within a cluster or among multiple clusters. For example, resources 418A-418F of server 4 318 may be identified and analyzed with respect to resources 428A-428F of server 8 328.

The comparison of resources can be controlled by a centralized comparison server or application, such as virtual machine provisioning system 340, shown in FIG. 3. System 340 may include components that recommend where and how to implement and group particular virtual machines. System 340 may be used for overall planning of an entire virtualization environment and for the provisioning of virtual machines.

According to an embodiment, when a virtual machine is requested, system 340 may look to available vLANs for provisioning. However, based on an analysis of identified resources, some vLANs may be marked as unavailable while others are available.

Figure 5:
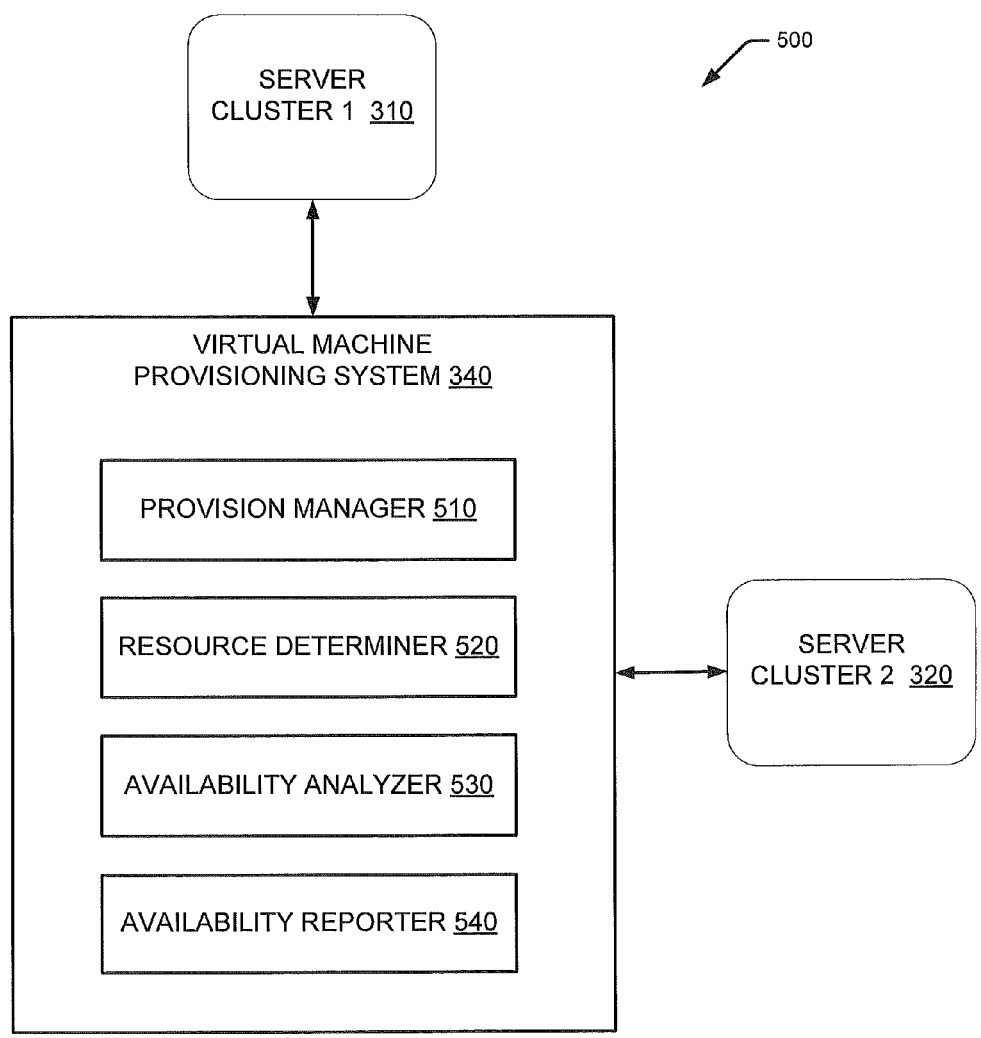
FIG. 5 is a diagram of a system for provisioning a virtual machine according to some embodiments.

FIG. 5 illustrates system 500, which shows various components of system 340 in more detail, according to further embodiments. Virtual machine provisioning system 340 includes provision manager 510, resource determiner 520, availability analyzer 530 and availability reporter 540.

Provision manager 510 is configured to receive a request to provision a virtual machine from a plurality of virtual machine clusters. This request may have originated from a user or a computer. Often a request for one or more virtual machines is accompanied by a required configuration for each virtual machine. The configuration may include a software configuration and any resource requirements. Such resource requirements may include a number of CPUs or IP addresses and a minimum amount of memory. Virtual machines may also be provisioned with a default configuration if no specific configuration is requested.

Resource determiner 520 is configured to determine resources and the utilization of the resources for each cluster of the plurality of virtual machine clusters. The resources may include internet protocol (IP) addresses, memory and CPUs. The utilization of IP addresses may indicate a number of IP addresses used out of a total number of possible IP addresses for a respective cluster of the plurality of virtual machine clusters. The utilization of memory may indicate memory used out of a total memory capacity for the respective cluster. The utilization of CPUs may indicate physical and/or virtual CPU workload out of a total physical and/or virtual CPU capacity for the respective cluster. The utilization of other resources may be determined in a similar fashion.

CPU information may be identified based on a number of CPUs per server or virtual machine. Virtual CPUs may also be counted. A current utilization percentage or a percentage of utilization over a period of time may be identified. Memory and physical disk information may also be identified based on utilization and capacity.

This resource utilization information may have been collected asynchronously or on a periodic schedule. Network address resource information may be identified by pinging a subnet, performing a sweep, counting network cards or connections, or using other networking utilities. In many cases, determining utilization of resources may include further operations to obtain resource information. In other cases, determining utilization of resources may also include finding or identifying resource utilization information that was determined by other components or operations.

Availability analyzer 530 is configured to analyze availability of clusters based on the identified resources and resource utilization for each cluster. According to an embodiment, availability analyzer assigns weights to the resources for each cluster of the plurality of virtual machine clusters responsive to the utilization of the respective resources. Availability analyzer 530 also analyzes the utilization of the resources and the weights of the resources for each cluster of the plurality of virtual machine clusters to identify clusters that are available for provisioning a virtual machine.

In an embodiment, availability analyzer 530 assigns a first weight to a first resource of the respective cluster of the plurality of virtual machine clusters based on a first comparison of utilization of the first resource to a first utilization threshold. Availability analyzer 530 also assigns a second weight to a second resource of the respective cluster of the plurality of virtual machine clusters based on a second comparison of utilization of the second resource to a second utilization threshold.

The second weight is determined responsive to a comparison of the first comparison and the second comparison. How the first resource utilization compares to a first threshold and how the second resource compares to the second threshold determines if the first weight is a higher or lower weight than the second weight. For example, if the first resource utilization is far from satisfying the first threshold and the second resource utilization is close to satisfying the second threshold, the first resource may receive the greater weight or higher ranking. Every other resource may receive a weight based on its comparison of its utilization to its threshold. Those resources satisfying the utilization threshold, or showing a resource that is not being used at a very high level, may receive lower weights or lower rankings. For example, if 90% of IP addresses are used when the threshold is 60% and memory use is 55% with a memory utilization threshold of 65%, the IP addresses will receive the higher ranking as its utilization is at a critical level and at a high level of concern. In many cases, the higher the critical level, the higher the weight.

In a further example, for each cluster, availability analyzer 530 assigns a first weight to a first resource of a cluster based on the first resource exceeding a first threshold. For example, IP address availability is important. If available IP addresses are below a certain threshold number, the threshold has been exceeded or not satisfied. A threshold may be considered exceeded whether the indicator is above or below a metric. In some cases, exceeding a threshold includes meeting a threshold for purposes of measuring certain utilization conditions. If IP addresses exceed a threshold of utilization, then a weight may be assigned to it. It may be a greatest weight, a class of weight or a ranking. A second weight is assigned to a second resource of the cluster. For example, a second lesser weight is given to the CPU utilization resource. Other resources may be assigned similar or different weights.

In a further embodiment, availability analyzer 530 calculates an availability value based on the weights assigned to the respective resources of the cluster and determines whether or not the cluster is available for provisioning a virtual machine based on the availability value. This calculation may be a formula or algorithm that accounts for the amount of utilization, any thresholds, assigned weights and other factors related to the resources. The resulting value or metric may be numerical and availability may be determined on whether the value meets or exceeds a certain threshold. For example, a utilization percentage for a resource may be calculated while factoring in its weight. The resource values may be combined or classified into an availability value. The calculated availability value may be too high or too low for the cluster to provision a virtual machine.

Availability reporter 540 is configured to output a cluster availability report. The cluster availability report indicates an availability status for each cluster of the plurality of virtual machine clusters. This report may be a heat map, as shown in by report view 800 in FIG. 8 and described below. Such reports may provide more detail or granularity for provisioning decisions and for observing trends.

Figure 6:
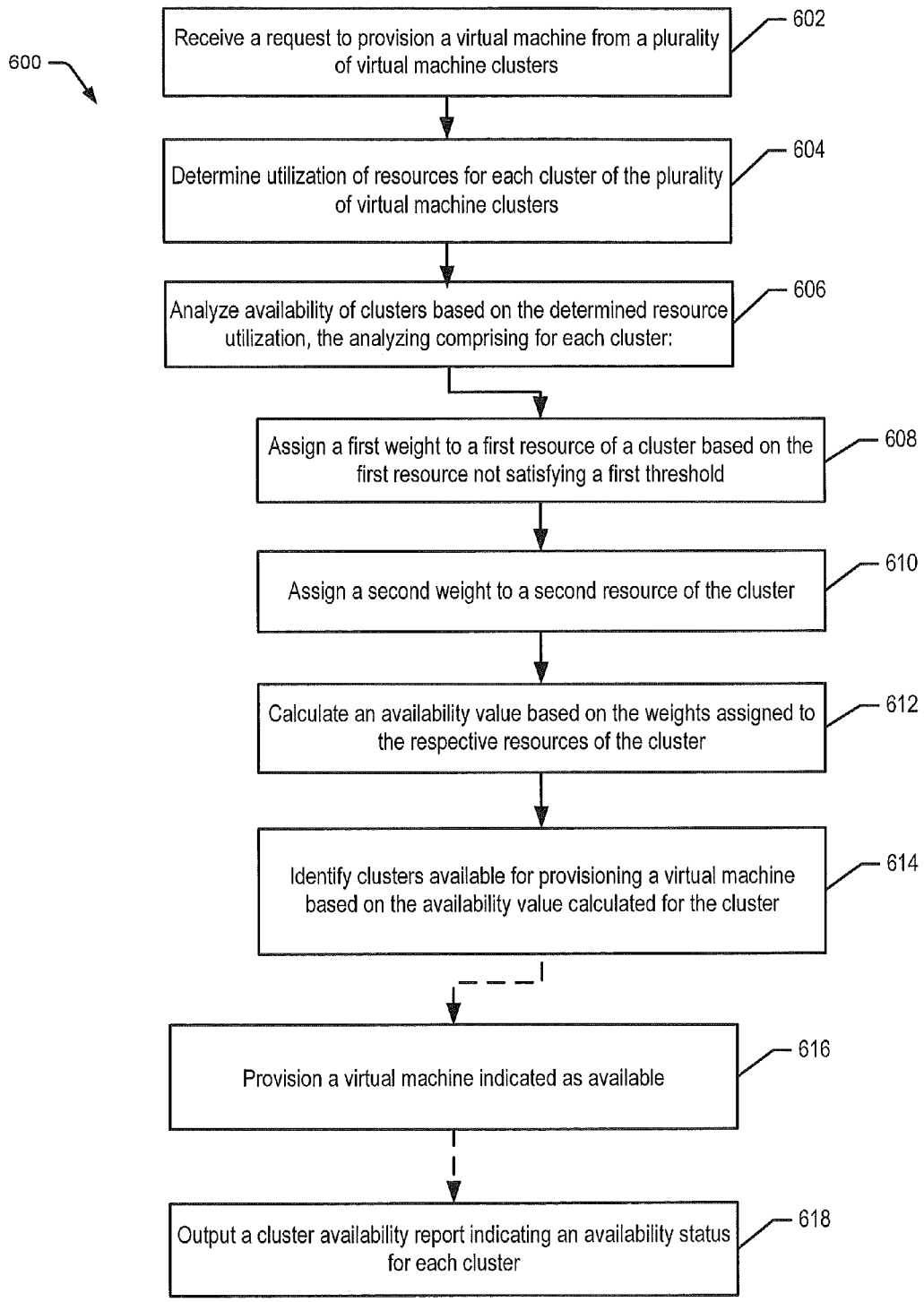
FIGS. 6-7 are flowcharts that illustrate example methods for provisioning a virtual machine according to some embodiments.
Figure 7:
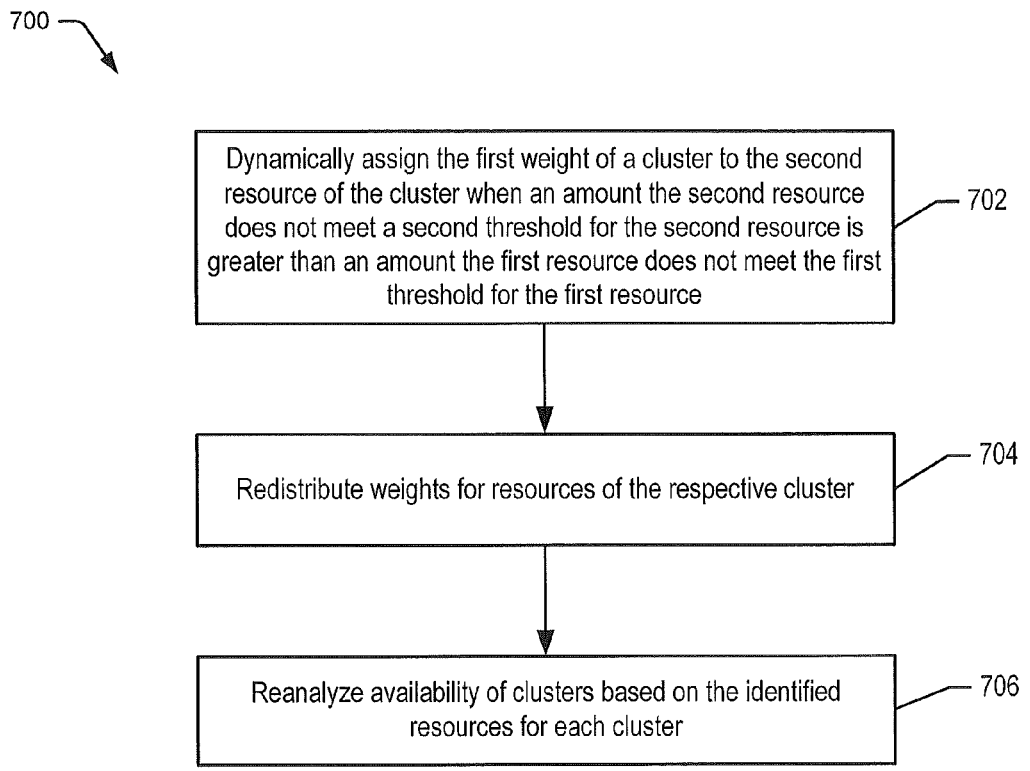

These and other more generalized operations and methods are illustrated by method 600 of FIG. 6, which may be performed by an embodiment of system 340. Numerical representations or other symbolic representations of the categories can be substituted. In block 602 of FIG. 6, a request to provision a virtual machine from a plurality of virtual machine clusters is received. This request may be received by provision manager 510. In block 604, resources and resource utilization for each cluster of the plurality of virtual machine clusters are identified by resource determiner 520. The resources may comprise internet protocol (IP) addresses, memory, CPUs. Other resources, such as those shown in FIG. 4, may be identified. Resources may be identified using resource utilities or by obtaining information collected by the individual servers or clusters.

The availability of clusters may be analyzed based on the identified resources for each cluster (block 606 of FIG. 6). Weights may be assigned to the resources responsive to determined or identified utilization of the resources. Resource utilization and weights may be analyzed for each cluster to determine cluster availability. For example, availability analyzer 530 may perform the analysis for each of one or more clusters and the analysis may include any combination of blocks 608-614. In block 608, a first weight is assigned to a first resource of a cluster based on the first resource not satisfying a first threshold. For example, if a utilization threshold is exceeded, the threshold is not satisfied. In some cases, a threshold is not satisfied when a utilization metric does not reach the threshold. However, for availability, more resource utilization may be less desirable and therefore a threshold is a level where anything above it may be cause for alarm. A second weight is assigned to a second resource of the cluster (block 610). Other weights may be assigned for the remaining resources.

An availability value or metric is calculated based on the weights assigned to the respective resources of the cluster (block 612). It is then determined whether or not the cluster is available for provisioning a virtual machine based on the availability value calculated for the cluster. If so, the cluster is identified as available (block 614). This may lead to some clusters being marked as unavailable for provisioning. Other clusters may become available and be added to an availability list or report.

In some cases, a virtual machine indicated as available is provisioned responsive to the cluster availability report (block 616). In some cases, the provisioning may be performed by provisioning system 340. In other cases, the provisioning may be performed by an existing provisioning component separate from provisioning system 340.

In further cases, a cluster availability report is reported out or made available (block 618) by availability reporter 540. The cluster availability report indicates an availability status for each cluster of the plurality of virtual machine clusters. The report may also provide the details of the resources so as to further show the true availability or borderline availability of some systems.

Cluster values and resource weights may be dynamically adjusted based on changes in the availability of critical resources. This may be illustrated by example method 700 of FIG. 7. In block 702, the first weight of the respective cluster of the plurality of virtual machine clusters is dynamically assigned to the second resource of the respective cluster and the second weight of the respective cluster is assigned to the first resource of the respective cluster when an amount that the second resource does not meet the second utilization threshold for the second resource is greater than the amount the first resource does not meet the first utilization threshold for the first resource. The assigning is dynamic because it may change based on new information about the resources caused by events or periodic inquiries.

In one example, the first weight of a cluster may be dynamically assigned to the second resource of the cluster when the second resource exceeds a second threshold for the second resource more so than the first resource exceeds the first threshold. For example, CPU utilization may be 80% or 5% above a specified CPU threshold of 75%. However, memory utilization may be at 95% or 10% above a specified memory threshold of 85%. CPU utilization may have been previously assigned the greater weight of 5 and memory utilization a lesser weight of 2. However, as the memory utilization exceeds its threshold by a greater amount than the CPU utilization, memory utilization has become the more critical resource and is assigned the greater weight of 5, while the CPU utilization is assigned a lesser weight of 2.

Weights for the resources may be redistributed (block 704). The availability of the clusters is then reanalyzed based on the weighted resources of the clusters (block 706). In an example, the identifying, the assigning and the analyzing are repeated. This may also involve recalculating and reanalyzing the availability values of each cluster after the adjustment. An updated availability report can be generated.

According to some embodiments, availability analysis is repeated and another report is generated upon a completion of a lease of a virtual machine of a cluster. Some leases are for a specified number of virtual machines or servers for a specified period of time.

It is determined what clusters are available. When the availability value does not meet an availability threshold, the cluster is eliminated from availability. If the availability value meets the availability threshold, the cluster is added to the available clusters.

A cluster availability report may be made available to an administrator or any software that provisions virtual machines. The report may be accessed from a central place or distributed. In some embodiments, a cluster availability report is a heat map of cluster information that indicates an availability of each cluster according to a display code. An example heat map display 800 is shown in FIG. 8. Heat map display 800 shows various resource headings such as disk space, CPU utilization and memory utilization. Importantly, it also shows available IP addresses.

Some resources are shown to be at or approaching critical levels according to a display code, such as cell coloring or shading. For example, resource 814G of vLAN 2 is lightly shaded because the capacity exceeds a threshold of VMs available. CPU resource 824B and memory resource 824C of vLAN 3 appear adequate but IP address resource 824A is heavily shaded as it exceeds a critical level. Resource 824A may be assigned a weight of 5 according to its criticality, while resources 824B and 824C are assigned weights of 2 and 3. This vLAN may likely be eliminated from availability according to an overall availability value calculated for the vLAN.

However, resource utilization can change and weights may be dynamically reassigned. For example, heat map view 900 of FIG. 9 may show an adjusted view based on a later point in time. For example, some applications may have terminated and freed up some IP addresses, as shown by resource 824A in FIG. 9. However, more virtual machines have taken on some intensive applications. Consequently, CPU resource 824B has just become more important to watch. The weight ranking of 5 previously assigned to 824A has now been assigned to 824B. In this case, CPU resource 824B exceeded a threshold at a greater amount than IP address resource 824A. Now, IP address resource 824A in FIG. 9 has been reassigned a weight of 3. A total availability value is then recalculated for affected cluster vLAN 2.

In another implementation, the functionality of system 340 may be provided through a browser on a computing device. The browser may be any commonly used browser, including any multithreading browser. System 340 may be software in a browser or software displayed by the browser. System 340 may be software hosted by a server and served to client devices over a network.

As will be appreciated by one of skill in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 10:
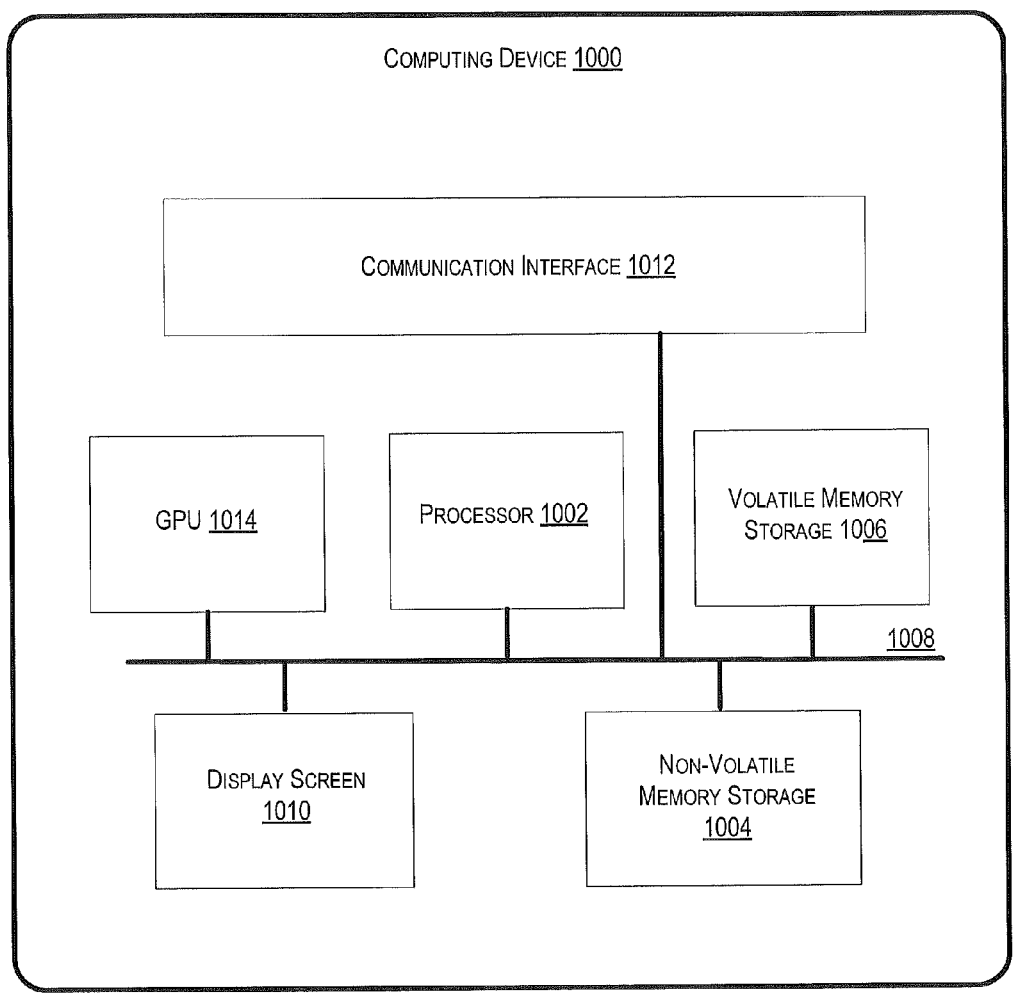
FIG. 10 is a block diagram of a computing device in which embodiments can be implemented.

FIG. 10 is an example computer system 1000 in which embodiments of the present disclosure, or portions thereof, may be implemented as computer-readable code. For example, the components of system 340, computer systems 100, or hardware platform 114 or any other components of systems 300-500, methods 600 and 700, or report displays 800 and 900 may be implemented in one or more computer devices 1000 using hardware, software implemented with hardware, firmware, tangible computer-readable storage media having instructions stored thereon, or a combination thereof and may be implemented in one or more computer systems or other processing systems. Components and methods in FIGS. 1-9 may be embodied in any combination of hardware and software.

Computing device 1000 may include one or more processors 1002, one or more non-volatile storage mediums 1004, one or more memory devices 1006, a communication infrastructure 1008, a display screen 1010 and a communication interface 1012. Computing device 1000 may also have networking or communication controllers, input devices (keyboard, a mouse, touch screen, etc.) and output devices (printer or display).

Processor(s) 1002 are configured to execute computer program code from memory devices 1004 or 1006 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 1014 is a specialized processor that executes instructions and programs, selected for complex graphics and mathematical operations, in parallel.

Non-volatile storage 1004 may include one or more of a hard disk drive, flash memory, and like devices that may store computer program instructions and data on computer-readable media. One or more of non-volatile storage device 1004 may be a removable storage device.

Memory devices 1006 may include one or more volatile memory devices such as but not limited to, random access memory. Communication infrastructure 1008 may include one or more device interconnection buses such as Ethernet, Peripheral Component Interconnect (PCI), and the like.

Typically, computer instructions are executed using one or more processors 1002 and can be stored in non-volatile storage medium 1004 or memory devices 1006.

Display screen 1010 allows results of the computer operations to be displayed to a user or an application developer.

Communication interface 1012 allows software and data to be transferred between computer system 1000 and external devices. Communication interface 1012 may include a modem, a network interface (such as an Ethernet card), a communications port, a PCMCIA slot and card, or the like. Software and data transferred via communication interface 1012 may be in the form of signals, which may be electronic, electromagnetic, optical, or other signals capable of being received by communication interface 1012. These signals may be provided to communication interface 1012 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

What is claimed is:

1. A computer-implemented method, comprising:
   determining, using a computing device, utilization of resources for each cluster of a plurality of virtual machine clusters responsive to a request to provision a virtual machine of the plurality of virtual machine clusters;
   assigning weights to the resources for each cluster of the plurality of virtual machine clusters responsive to the determining, wherein assigning weights comprises:
     determining a first deviation of a utilization of a first resource of the respective cluster of the plurality of virtual machine clusters below a first utilization threshold;
     determining a second deviation of a utilization of a second resource of the respective cluster of the plurality of virtual machine clusters below a second utilization threshold, wherein the second deviation is greater than the first deviation;

assigning a first weight to the first resource of the respective cluster of the plurality of virtual machine clusters based on a magnitude of the first deviation;

assigning a second weight, smaller than the first weight, to the second resource of the respective cluster of the plurality of virtual machine clusters based on a magnitude of the second deviation and a comparison of the first deviation to the second deviation;

determining that the utilization of the second resource exceeds the second utilization threshold;

determining that the utilization of the first resource exceeds the first utilization threshold;

determining that an amount the utilization of the second resource exceeds the second utilization threshold for the second resource is greater than an amount the utilization of the first resource exceeds the first utilization threshold; and reassigning the first weight to the second resource and the second weight to the first resource responsive to the determination that the utilization of the second resource exceeds the second utilization threshold for the second resource more than the utilization of the first resource exceeds the first utilization threshold;

identifying clusters that are available for provisioning a virtual machine, the identifying comprising calculating an availability value for each cluster of the plurality of virtual machine clusters by analyzing the utilization of the resources and the weights of the resources for each cluster of the plurality of virtual machine clusters, wherein a cluster of the plurality of virtual machine clusters is identified as being available if its availability value satisfies an availability threshold; and provisioning a virtual machine from a cluster of the plurality of virtual machine clusters identified as available for provisioning a virtual machine based on its availability value.

2. The method of claim 1, further comprising outputting a cluster availability report, wherein the cluster availability report indicates an availability status for each cluster of the plurality of virtual machine clusters.

3. The method of claim 2, wherein the outputting a cluster availability report comprises displaying a heat map of cluster information indicating an availability of each cluster according to a display code.

4. The method of claim 1, wherein the plurality of resources comprises internet protocol (IP) addresses, memory and CPUs, and wherein utilization of IP addresses indicates a number of IP addresses used out of a total number of possible IP addresses for a respective cluster of the plurality of virtual machine clusters, utilization of memory indicates memory used out of a total memory capacity for the respective cluster and utilization of CPUs indicates CPU workload out of a total CPU capacity for the respective cluster.

5. The method of claim 1, wherein each cluster of the plurality of virtual machine clusters is a virtual local area network (vLAN).

6. The method of claim 1, wherein the determining, the assigning and the identifying are repeated based on at least one of a repetitive schedule and a termination of a lease of a virtual machine of a cluster of the plurality of virtual machine clusters.

7. A computer system for provisioning a virtual machine on a computer system, comprising:
a processor and a memory;

a provision manager receiving a request to provision a virtual machine of a plurality of virtual machine clusters;

a resource determiner determining utilization of resources for each cluster of the plurality of virtual machine clusters; and an availability analyzer, implemented with a computing device,
assigning weights to respective resources for each cluster of the plurality of virtual machine clusters responsive to the utilization of the respective resources, wherein assigning weights comprises the availability analyzer to:
determining a first deviation of a utilization of a first resource of the respective cluster of the plurality of virtual machine clusters below a first utilization threshold;

determining a second deviation of a utilization of a second resource of the respective cluster of the plurality of virtual machine clusters below a second utilization threshold, wherein the second deviation is greater than the first deviation;

assigning a first weight to the first resource of the respective cluster of the plurality of virtual machine clusters based on a magnitude of the first deviation;

assigning a second weight, smaller than the first weight, to the second resource of the respective cluster of the plurality of virtual machine clusters based on a magnitude of the second deviation and a comparison of the first deviation to the second deviation;

determining that the utilization of the second resource exceeds the second utilization threshold;

determining that the utilization of the first resource exceeds the first utilization threshold;

determining that an amount the utilization of the second resource exceeds the second utilization threshold for the second resource is greater than an amount the utilization of the first resource exceeds the first utilization threshold;

reassigning the first weight to the second resource and the second weight to the first resource responsive to the determination that the utilization of the second resource exceeds the second utilization threshold for the second resource more so than the utilization of the first resource exceeds the first utilization threshold; and identifying clusters that are available for provisioning a virtual machine by calculating an availability value for each cluster of the plurality of virtual machine clusters by analyzing the utilization of the resources and the weights of the resources for each cluster of the plurality of virtual machine clusters, wherein a cluster of the plurality of virtual machine clusters is identified as being available if its availability value satisfies an availability threshold;

the provision manager further provisioning a virtual machine from a cluster of the plurality of virtual machine clusters identified as available for provisioning a virtual machine based on its availability value.

8. The system of claim 7, further comprising an availability reporter outputting a cluster availability report indicating an availability status for each cluster of the plurality of virtual machine clusters.

9. The system of claim 8, wherein the cluster availability report comprises a heat map of cluster information indicating an availability of each cluster according to a display code.

10. The system of claim 7, wherein the plurality of resources comprises internet protocol (IP) addresses, memory and CPUs, and wherein utilization of IP addresses indicates a number of IP addresses used out of a total number of possible IP addresses for a respective cluster of the plurality of virtual machine clusters, utilization of memory indicates memory used out of a total memory capacity for the respective cluster and utilization of CPUs indicates CPU workload out of a total CPU capacity for the respective cluster.

11. A computer program product, comprising:
a non-transitory tangible computer readable storage medium having computer readable program code embodied in the medium that when executed by a processor causes the processor to perform operations comprising:
determining, using a computing device, utilization of resources for each cluster of a plurality of virtual machine clusters responsive to a request to provision a virtual machine of the plurality of virtual machine clusters;
assigning weights to the resources for each cluster of the plurality of virtual machine clusters responsive to the determining, wherein assigning weights comprises:
determining a first deviation of a utilization of a first resource of the respective cluster of the plurality of virtual machine clusters below a first utilization threshold;
determining a second deviation of a utilization of a second resource of the respective cluster of the plurality of virtual machine clusters below a second utilization threshold, wherein the second deviation is greater than the first deviation;
assigning a first weight to the first resource of the respective cluster of the plurality of virtual machine clusters based on a magnitude of the first deviation;
assigning a second weight, smaller than the first weight, to the second resource of the respective cluster of the plurality of virtual machine clusters based on a magnitude of the second deviation and a comparison of the first deviation to the second deviation;
determining that the utilization of the second resource exceeds the second utilization threshold;
determining that the utilization of the first resource exceeds the first utilization threshold;
determining that an amount the utilization of the second resource exceeds the second utilization threshold for the second resource is greater than an amount the utilization of the first resource exceeds the first utilization threshold; and
reassigning the first weight to the second resource and the second weight to the first resource responsive to the determination that the utilization of the second resource exceeds the second utilization threshold for the second resource more than the utilization of the first resource exceeds the first utilization threshold;
identifying clusters that are available for provisioning a virtual machine, the identifying comprising calculating an availability value for each cluster of the plurality of virtual machine clusters by analyzing the utilization of the resources and the weights of the resources for each cluster of the plurality of virtual machine clusters, wherein a cluster of the plurality of virtual machine clusters is identified as being available if its availability value satisfies an availability threshold; and
provisioning a virtual machine from a cluster of the plurality of virtual machine clusters identified as available for provisioning a virtual machine based on its availability value.

12. The computer program product of claim 11, further comprising computer readable program code causing the processor to perform:
outputting a cluster availability report indicating an availability status for each cluster of the plurality of virtual machine clusters.

13. The computer program product of claim 11, wherein the plurality of resources comprises internet protocol (IP) addresses, memory and CPUs, and wherein utilization of IP addresses indicates a number of IP addresses used out of a total number of possible IP addresses for a respective cluster of the plurality of virtual machine clusters, utilization of memory indicates memory used out of a total memory capacity for the respective cluster and utilization of CPUs indicates CPU workload out of a total CPU capacity for the respective cluster.

14. The method of claim 1, wherein the first utilization threshold and the second utilization threshold comprise a first and a second specified utilization value respectively, wherein a respective specified utilization value is less than a maximum utilization value.

15. The system of claim 7, wherein the first utilization threshold and the second utilization threshold comprise a first and a second specified utilization value respectively, wherein a respective specified utilization value is less than a maximum utilization value.

16. The computer program product of claim 11, wherein the first utilization threshold and the second utilization threshold comprise a first and a second specified utilization value respectively, wherein a respective specified utilization value is less than a maximum utilization value.

17. The method of claim 1, wherein the resources to which weights are assigned for each cluster of the plurality of virtual machine clusters comprise resources of more than one computer server.

18. The system of claim 7, wherein the resources to which weights are assigned for each cluster of the plurality of virtual machine clusters comprise resources of more than one computer server.

* * * * *